United States Patent
Castellani et al.

(10) Patent No.: US 7,672,555 B2
(45) Date of Patent: Mar. 2, 2010

(54) CABLE WITH A COATING LAYER MADE FROM A WASTE MATERIAL

(75) Inventors: Luca Castellani, Milan (IT); Andrea Pelizzoni, Milan (IT); Franco Peruzzotti, Milan (IT); Enrico Albizzati, Milan (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 0 days.

(21) Appl. No.: 10/573,595

(22) PCT Filed: Sep. 30, 2003

(86) PCT No.: PCT/EP03/10812

§ 371 (c)(1),
(2), (4) Date: Aug. 27, 2008

(87) PCT Pub. No.: WO2005/041214

PCT Pub. Date: May 6, 2005

(65) Prior Publication Data

US 2008/0304797 A1 Dec. 11, 2008

(51) Int. Cl.
*G02B 6/44* (2006.01)
(52) U.S. Cl. ..................................... 385/100; 385/123
(58) Field of Classification Search ......... 385/100–114, 385/123–128
See application file for complete search history.

(56) References Cited

U.S. PATENT DOCUMENTS 6,492,596 B1 12/2002 Higashikubo et al.

FOREIGN PATENT DOCUMENTS

| GB | 2 149 411 A | 6/1985 |
|---|---|---|
| JP | 2001-098124 | 4/2001 |
| JP | 2002-363363 | 12/2002 |
| JP | 2003-299167 | 10/2003 |
| JP | 2003-334330 | 11/2003 |
| JP | 2004-198117 | 7/2004 |
| WO | WO 98/52197 | 11/1998 |
| WO | WO 02/36680 A1 | 5/2002 |

*Primary Examiner*—Kevin S Wood
(74) *Attorney, Agent, or Firm*—Finnegan, Henderson, Farabow, Garrett & Dunner, L.L.P.

(57) ABSTRACT

A cable including at least one core having at least one transmissive element and at least one coating layer made from a coating material, wherein the coating material has at least a first polyethylene having a density not higher than 0.940 g/cm$^3$, preferably not lower than 0.910 g/cm$^3$, more preferably 0.915 g/cm$^3$ to 0.938 g/cm$^3$, and a Melt Flow Index (MFI), measured at 190° C. with a load of 2.16 Kg according to ASTM D1238-00 standard, of 0.05 g/10' to 2 g/10', preferably 0.1 g/10' to 1 g/10'; the first polyethylene being obtained from a waste material; at least a second polyethylene having a density higher than 0.940 g/cm$^3$, preferably not higher than 0.970 g/cm$^3$, more preferably 0.942 g/cm$^3$ to 0.965 g/cm$^3$. Preferably, the coating layer is a cable external layer having a protective function.

46 Claims, 6 Drawing Sheets

CABLE WITH A COATING LAYER MADE FROM A WASTE MATERIAL

CROSS REFERENCE TO RELATED APPLICATION

This application is a national phase application based on PCT/EP2003/010812, filed Sep. 30, 2003, the content of which is incorporated herein by reference.

BACKGROUND OF THE INVENTION

1. Field of the Invention

The present invention relates to a cable with a coating layer made from a waste material.

More particularly, the present invention relates to a cable including at least one core comprising at least one transmissive element and at least one coating layer, said coating layer being made from a coating material comprising at least one polyethylene obtained from a waste material.

Moreover, the present invention relates to a process for producing said cable.

For the purposes of the present description and of the subsequent claims, the term "core" of a cable is used to indicate a semi-finished structure comprising a transmissive element, such as an electrical energy transmissive element, an optical signal transmissive element or an element which both transmits both electrical energy and optical signals, and at least one electrical isolation or, respectively, at least one containment element (such as, for example, a tube, a sheath, a microsheath or a grooved core), or at least two elements, one of which is an electrical isolation element and one is a containment element, arranged at a radially outer position with respect to the corresponding transmissive element.

For the purposes of the present description and of the subsequent claims, the term "electrical energy transmissive element" is used to indicate any element capable of transmitting electrical energy such as, for example, a metallic conductor element. As an illustrative example, if we consider a cable for transporting or distributing medium/high voltage electrical energy (where medium voltage indicates a voltage comprised between about 1 kV and about 30 kV, whereas high voltage indicates a voltage greater than about 30 kV), the "core" of the cable further comprises an inner semiconductive coating layer arranged at a radially outer position with respect to the conductor element, an outer semiconductive coating layer arranged at a radially outer position with respect to the electrical isolation element, a metallic screen arranged at a radially outer position with respect to said outer semiconductive coating layer, and an external layer arranged at a radially outer position with respect to said metallic screen.

For the purposes of the present description and of the subsequent claims, the term "optical signal transmissive element" is used to indicate any transmission element comprising at least one optical fibre. Therefore, such a term identifies both a single optical fibre and a plurality of optical fibres, optionally grouped together to form a bundle of optical fibres or arranged parallel to each other and coated with a common coating to form a ribbon of optical fibres. As an illustrative example, if we consider an optical cable the "core" of the cable further comprises a coating layer arranged at a radially outer position with respect of the grooved core, a tensile reinforcing layer at a radially outer position with respect to said outer coating layer, and an external layer arranged at a radially outer position with respect to said tensile reinforcing layer.

For the purposes of the present description and of the subsequent claims, the term "mixed electro-optical transmissive element" is used to indicate any element capable of transmitting both electrical energy and optical signals in accordance with the abovementioned definitions.

For the purposes of the present description and of the subsequent claims, the term "coating layer" means any coating deposited on the transmissive element of a cable for protective purposes, e.g. to preventing the damages of the transmission element due to mechanical stresses during manufacturing, installation and use.

The present inventions also refers to cables provided with a plurality of cores as defined above, known in the field with the terms "bipolar cable", "tripolar cable" and "multipolar cable", depending on the number of cores incorporated therein (in the mentioned cases in number of two, three, or greater, respectively).

In accordance with the abovementioned definitions, the present invention refers to cables provided with one or more cores of any type. In other words, the present invention refers to unipolar or multipolar cables, of electrical type for transporting or distributing electrical energy, or of the optical type comprising at least one optical fibre, or of the mixed energy/telecommunications type.

2. Description of the Related Art

Nowaday, the possibility of using polymer obtained from waste materials for the manufacturing of new products, is a problem of increasing importance for ecological reason and for reducing costs.

In the field of cables, some efforts have been already done in order to use recycled polymer materials, in particular polyvinyl chloride or ethylene polymers obtained from waste cable sheaths. Said recycled polymer materials are generally used for making cable coating layers.

For example, JP 2002/080671 discloses a polyvinyl chloride-based recycled plastic composition obtained by mixing and melting covering plastics and sheaths of waste cables containing: (A) polyvinyl chloride and (B) polyethylene or silane-crosslinked polyethylene, with chlorinated polyethylene. The abovementioned polyvinyl chloride-based resin is said to be useful for making cable sheaths.

JP 2001/098124 relates to a thermoplastic resin composition and to an electrical cable covered with said composition. The thermoplastic resin composition comprises: (A) 1-99 parts by weight of a resin composition containing a polyvinyl chloride resin and a polyethylene resin, said polyvinyl chloride resin and polyethylene resin obtained from waste electrical cables; and (B) 1-99 parts by weight of a multiphase graft copolymer containing (i) 5%-99% by weight of thermoplastic elastomeric units and (ii) 1%-95% by weight of vinyl polymer units where one of the units form a dispersed phase with a particle size of between 0.001 µm-10 µm in the other units. The abovementioned resin composition is said to have a good flexibility and processability when used as an insulating layer or sheath for a cable.

JP 2002/363364 relates to a recycled polyvinyl chloride resin composition comprising a plasticizer having a molecular weight of at least 500 such as, for example, a trimellitate-based, a polyester-based or an epoxy-based plasticizer. The abovementioned composition is said to be useful as covering materials for electrical cables.

JP 2002/363363 relates to a recycled polyvinyl chloride-containing resin composition and to an electrical wire or cable made therefrom. Said composition comprises 100 parts by weight of a 99:1 to 70:30 mixture of a polyvinyl chloride resin which typically is a recycled material and a polyolefin resin, and 1-20 parts by weight with respect to 100 parts by weight of said mixture, of a block copolymer of an acrylic polymer and a hydrogenated polybutadiene in a ratio of 50:50 to 10:90. The abovementioned composition is said to be useful as a covering material for wires and cables.

JP 2002/103329 relates to a method for recycling used vinyl films (e.g. polyvinyl chloride films) for agriculture. The method comprises cutting the used vinyl films roughly; removing impurities such as metals and sand from cut pieces; feeding dried fluff obtained by grinding, washing, dehydrating, and drying said pieces, a plasticizer, a heat stabilizer, and other additives to a heater mixer; keading them; feeding the mixture in a semi-molten state to a cooler mixer; stirring it feeding it to an extruder; extruding it under heated conditions; passing trough a water bath; and pelletizing it. The obtained pellets are dried to form a compound for molding the electrical cable sheath material. Said electrical cable is said to have good properties comparable to a cable having a virgin polyvinyl chloride sheath.

However, the use of recycled polymers may show some drawbacks. In particular, the Applicant has noticed that the use of recycled polyethylene may provide coating layers having poor mechanical properties, in particular stress at break and elongation at break, and poor environmental stress cracking resistance, with respect to those obtained from virgin polymer materials. Moreover, said coating layers may show poor appearance, mainly due to the formation of defects on their surface such as, for example, little agglomerates, which impair not only their appearance and smoothness but also their mechanical properties.

The Applicant believes that the above drawbacks may be due to partial degradation of polyethylene upon prolonged exposure to sunlight and to atmospherical agents, and/or to reprocessing to which said polyethylene is subjected, such degradation causing worsening of mechanical properties and processability.

SUMMARY OF THE INVENTION

Applicant has found that a polyethylene obtained from waste material, in particular a polyethylene obtained from used agricultural films, may be advantageously used for the manufacturing of a coating layer of a cable. In particular, the Applicant has found that the addition of at least one polyethylene having a density higher than 0.940 g/cm$^3$ to said recycled polyethylene, allows to obtain a coating material able to overcome the above mentioned drawbacks. As a matter of fact, said coating material may be advantageously used in the manufacturing of a coating layer of a cable, said coating layer showing mechanical properties (in particular, stress at break and elongation at break) comparable to those obtained from a virgin polyethylene. Moreover, said coating layer shows a good hot pressure resistance. Furthermore, said coating layer shows an improved environmental stress cracking resistance with respect to the coating layer obtained from a recycled polyethylene alone.

In a first aspect, the present invention thus relates to a cable including at least one core comprising at least one transmissive element and at least one coating layer made from a coating material, wherein the coating material comprises:

at least a first polyethylene having a density not higher than 0.940 g/cm$^3$, preferably not lower than 0.910 g/cm$^3$, more preferably of between 0.915 g/cm$^3$ and 0.938 g/cm$^3$, and a Melt Flow Index (MFI), measured at 190° C. with a load of 2.16 Kg according to ASTM D1238-00 standard, of between 0.05 g/10 min, and 2 g/10 min, preferably of between 0.1 g/10 min and 1 g/10 min, said first polyethylene being obtained from a waste material;

at least a second polyethylene having a density higher than 0.940 g/cm$^3$, preferably not higher than 0.970 g/cm$^3$, more preferably of between 0.942 g/cm$^3$, and 0.965 g/cm$^3$.

Preferably, said coating layer is a cable external layer having a protective function.

According to a further aspect, the present invention also relates to a process for producing a cable including at least one core comprising at least one transmissive element and at least one coating layer made from a coating material, said process comprising the steps of:

providing at least a first polyethylene having a density not higher than 0.940 g/cm$^3$, preferably not lower than 0.910 g/cm, more preferably of between 0.915 g/cm$^3$ and 0.938 g/cm$^3$, and a Melt Flow Index (MFI), measured at 190° C. with a load of 2.16 Kg according to ASTM D1238-00 standard, of between 0.05 g/10 min and 2 g/10 min, preferably of between 0.1 g/10 min and 1 g/10 min, in a subdivided form, said first polyethylene being obtained from a waste material;

providing at least a second polyethylene having a density higher than 0.940 g/cm$^3$, preferably not higher than 0.970 g/cm$^3$, more preferably of between 0.942 g/cm$^3$ and 0.965 g/cm$^3$, in a subdivided form;

conveying at least one core comprising at least one transmissive element into an extruding apparatus comprising a housing and at least one screw rotatably mounted into said housing, said housing including at least a feed hopper and at least a discharge opening;

feeding said first and second polyethylenes to said extruding apparatus;

melting and mixing said first and second polyethylenes in said extruding apparatus to form a homogeneous mixture;

filtering said mixture;

depositing said mixture onto said core comprising at least one transmissive element so as to obtain the coating layer.

For the purpose of the present description and of the subsequent claims, the expression "in a subdivided form", generally means a product of granular form, with an average diameter generally of between about 0.5 mm and about 5 mm, preferably of between 1 mm and about 4 mm, more preferably of between 1.5 mm and 3 mm.

Preferably, said extruding apparatus is a single-screw extruder.

Preferably said melting and mixing is carried out at a temperature of between 150° C. and 250° C., more preferably of between 120° C. and 230° C.

According to one preferred embodiment, said first polyethylene and said second polyethylene are premixed before the step of feeding them to the extruding apparatus.

According to one preferred embodiment, said coating material may further comprise a carbon black.

According to a further preferred embodiment, said first polyethylene has a melting point lower than 130° C., preferably of between 100° C. and 125° C.

According to a further preferred embodiment, said first polyethylene has a melting enthalpy ($\Delta H_m$) of between 50 J/g and 150 J/g, preferably of between 80 J/g and 140 J/g.

Said melting enthalpy ($\Delta H_m$) may be determined by Differential Scanning Calorimetry with a scanning rate of 10° C./min: further details regarding the analysis method will be described in the examples given hereinbelow.

Said first polyethylene may further comprise a carbon black. Generally, said carbon black may be present in the polyethylene in an amount higher than 2% by weight, preferably of between 2.5% by weight and 4.0% by weight, with respect to the total weight of the polyethylene.

Said first polyethylene may be selected from low density polyethylene (LDPE), linear low density polyethylene (LLDPE), very low density polyethylene (VLDPE), or mixtures thereof. Mixtures of low density polyethylene with a small amount of linear low density polyethylene, preferably an amount not higher than 15% by weight with respect to the total weight of the polyethylene, are particularly preferred.

According to one preferred embodiment, said first polyethylene is present in the coating material in an amount of between 30% by weight and 90% by weight, preferably of between 40% by weight and 60% by weight, with respect to the total weight of the coating material.

Examples of said first polyethylene which may be used according to the present invention and which are currently commercially available are the products coming from used agricultural polyethylene films (e.g. the products Alfaten® from Alfagran).

According to one preferred embodiment, said second polyethylene has a Melt Flow Index (MFI), measured at 190° C. with a load of 2.16 Kg according to ASTM D1238-00 standard, of between 0.05 g/10 min and 2 g/10 min, preferably of between 0.1 g/10 min and 1 g/10 min.

According to a further preferred embodiment, said second polyethylene has a melting point higher than 120° C., preferably of between 125° C. and 165° C.

According to a further preferred embodiment, said second polyethylene has a melting enthalpy ($\Delta H_m$) of between 125 J/g and 200 J/g, preferably of between 130 J/g and 185 J/g.

Said melting enthalpy ($\Delta H_m$) may be determined by Differential Scanning Calorimetry as disclosed above.

According to a further preferred embodiment, said second polyethylene is a polyethylene obtained from waste material. Optionally, said polyethylene obtained from waste material comprises a small amount, preferably an amount not higher than 15% by weight with respect to the total weight of the polyethylene, of polypropylene.

According to one preferred embodiment, said second polyethylene is present in the coating material in an amount of between 10% by weight and 70% by weight, preferably of between 40% by weight and 60% by weight, with respect to the total weight of the coating material.

Examples of said second polyethylene which may be used according to the present invention and which are currently commercially available are the products DGDK-3364® Natural from Dow Chemical, or the products coming from used polyethylene bottles (e.g. from Breplast).

In order to protect the coating material from UV degradation said coating material, as reported above, may further comprise carbon black. Preferably, the carbon black is added to the coating material in an amount of between 2% by weight and 5% by weight, preferably of between 2.5% by weight and 4.0% by weight, with respect to the total weight of the coating material. The carbon black may be added to the coating material as such or as a masterbatch in polyethylene. Masterbatch is particularly preferred.

Other conventional additives may be added to the coating material according to the present invention such as, for example antioxidants, processing aids, lubricants, pigments, foaming agents, plasticizers, UV stabilizers, flame-retardants, fillers, thermal stabilizers, or mixtures thereof.

Conventional antioxidants suitable for the purpose may be selected from antioxidants of aminic or phenolic type such as, for example: polymerized trimethyl-dihydroquinoline (for example poly-2,2,4-trimethyl-1,2-dihydroquinoline); 4,4'-thiobis-(3-methyl-6-t-butyl)-phenol; pentaerythryl-tetra-[3-(3,5-di-t-butyl-4-hydroxyphenyl)propionate]; 2,2'-thiodiethylene-bis-[3-(3,5-di-t-butyl-4-hydroxyphenyl)propionate], or the mixtures thereof.

Conventional processing aids suitable for the purpose may be selected, for example, from: calcium stearate, zinc stearate, stearic acid, paraffin wax, or mixtures thereof.

Conventional fillers suitable for the purpose may be selected, for example, from glass particles, glass fibers, calcinated clay, talc, or mixtures thereof.

The coating material according to the present invention may be either crosslinked or non-crosslinked according to the required countries specifications. Preferably, said coating material is non-crosslinked.

If crosslinking is carried out, the coating material comprises also a crosslinking system, of the peroxide or silane type, for example. It is preferable to use a silane-based crosslinking system, using peroxides as grafting agents. Examples of organic peroxides that may be advantageously used, both as crosslinking agents or as grafting agents for the silanes, are dicumyl peroxide, t-butylcumylperoxide, 2,5-dimethyl-2,5-di(t-butylperoxy)-hexane, di-t-butylperoxide, t-butylperoxy-3,3,5-trimethyl-hexanoate, ethyl-3,3-di(t-butylperoxy)butyrate. Examples of silanes that may be advantageously used are ($C_1$-$C_4$)-alkyloxyvinylsilanes such as, for example, vinyldimethoxysilane, vinyltriethoxysilane, vinyldimethoxyethoxysilane.

The crosslinking system may also comprise a cross-linking catalyst selected from those known in the art. In the case of crosslinking with silanes, for example, lead dibutyl dilaurate may be advantageously used.

Said first polyethylene may be obtained from waste material as a product in subdivided form by means of processes known in the art. For example, said product in a subdivided form may be obtained by means of a process comprising the following steps:

(a) sorting out the impurities (such as, for example, metal, paper, etc) optionally present in a waste material (for example, by feeding said waste material to a conveyor belt and manually sorting out the impurities);

(b) feeding the waste material obtained in step (a) [(for example, by means of the same conveyor belt used in step (a)], to a mill obtaining flakes having an average diameter generally of between about 0.1 cm and about 2.0 cm;

(c) washing the flakes obtained in step (b) in water and filtering the same in order to discard the impurities having a density higher than 1 kg/l;

(d) drying the flakes obtained in step (c) (for example, in a drying apparatus) with warm and dry air;

(e) feeding the dried flakes obtained in step (d) to an extruding apparatus comprising a housing and at least one screw rotatably mounted into said housing, including at least a feed hopper and a discharge opening;

(f) melting and mixing said flakes obtaining a homogeneous mixture;

(g) filtering and granulating the homogeneous mixture obtained in step (f) obtaining a product in a subdivided form;

(h) cooling the product in a subdivided form obtained in step (g) (for example, in water);

(i) drying the cooled product obtained in step (h) (for example, in a drying apparatus) with warm and dry air.

Preferably, the homogeneous mixtures obtained in step (f) is fed to a second extruding apparatus to obtain a more homogeneous mixture.

Preferably, said extruding apparatuses are single-screw extruders.

Preferably, the granulation in step (g) may be carried out, by means of chopping or shredding the homogeneous mixture obtained in step (f) by means of cutting devices known in the art.

BRIEF DESCRIPTION OF THE DRAWINGS

Further details will be illustrated in the following, appended drawings, in which.

DETAILED DESCRIPTION OF THE INVENTION

Figure 1:
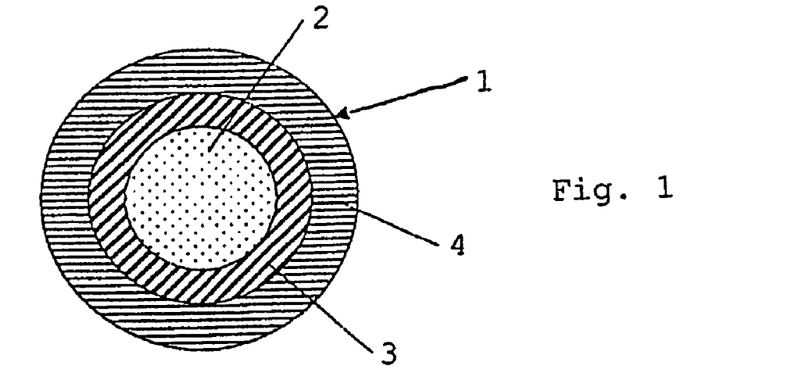
FIG. 1 shows, in cross section, an electrical cable of the unipolar type according to one embodiment of the present invention.

Referring to FIG. 1, cable 1 comprises a conductor 2, an internal insulating coating layer 3 and an external layer 4 which may be made according to the present invention.

Figure 2:
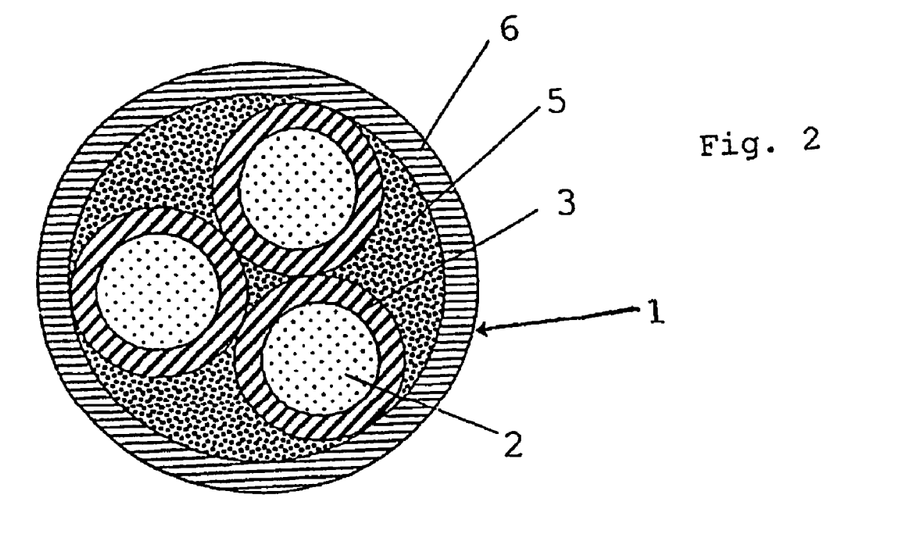
FIG. 2 shows, in cross section, an electrical cable of the tripolar type according to a further embodiment of the present invention.

Referring to FIG. 2, cable 1 comprises three conductors 2, each one covered by an insulating coating layer 3. The conductors 2 thus insulated are wound around one another and the interstices between the insulated conductors 2 are filled with a filler material that forms a continuous structure having a substantially cylindrical shape. The filler material 5 is preferably a flame-retarding material. An external layer 6, which may be made according to the present invention, is applied, generally by extrusion, to the structure thus obtained.

Figure 3:
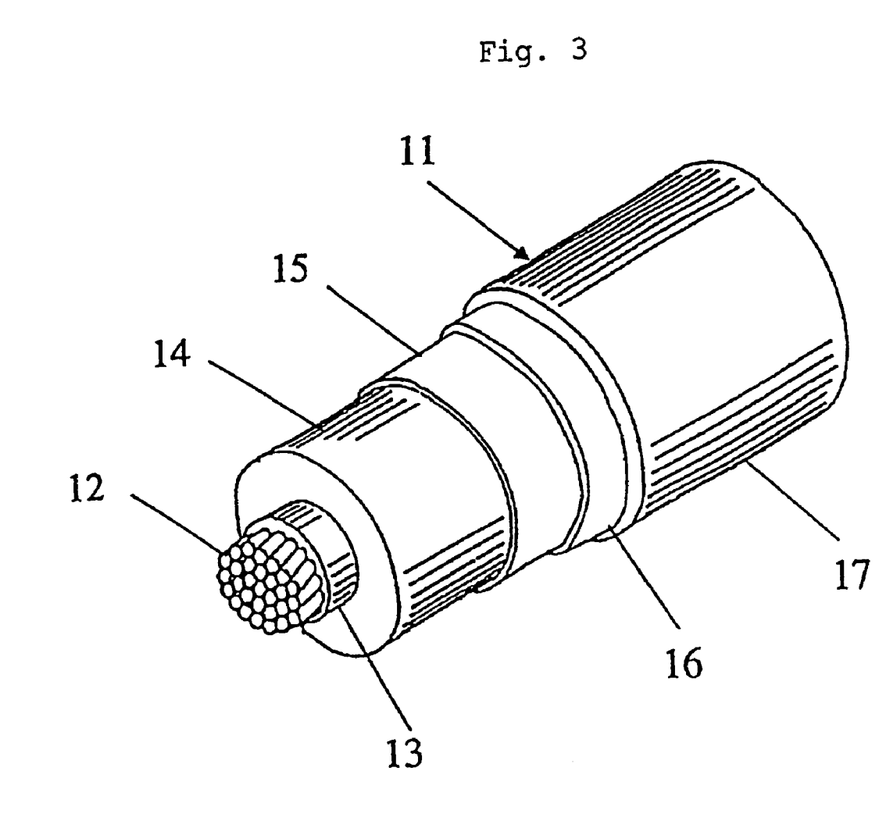
FIG. 3 shows, in perspective view, a length of cable with parts removed in stages, to reveal its structure according to a further embodiment of the present invention.

Referring to FIG. 3, cable 11 comprises, in order from the centre outwards: a conductor 12, an internal semiconducting layer 13, an insulating coating layer 14, an external semiconducting layer 15, a metallic screen 16, and an external layer 17.

The conductor 12 generally consists of metal wires, preferably of copper or aluminium, stranded together according to conventional techniques. The internal and external semiconducting layers 13 and 15 are extruded on the conductor 12, separately or simultaneously with the insulating coating layer 14. A screen 16, generally consisting of electrically conducting wires or tapes, wound spirally, is usually arranged around the external semiconducting layer 15. Said screen is then covered with an external layer 17, which may be made according to the present invention.

The cable may in addition be provided with an outer protective structure (not shown in FIG. 3), which mainly performs the function of mechanical protection of the cable against impact and/or compression. Said protective structure may be, for example, a metallic armour or a layer of expanded polymeric material as described in patent application WO 98/52197.

Figure 4:
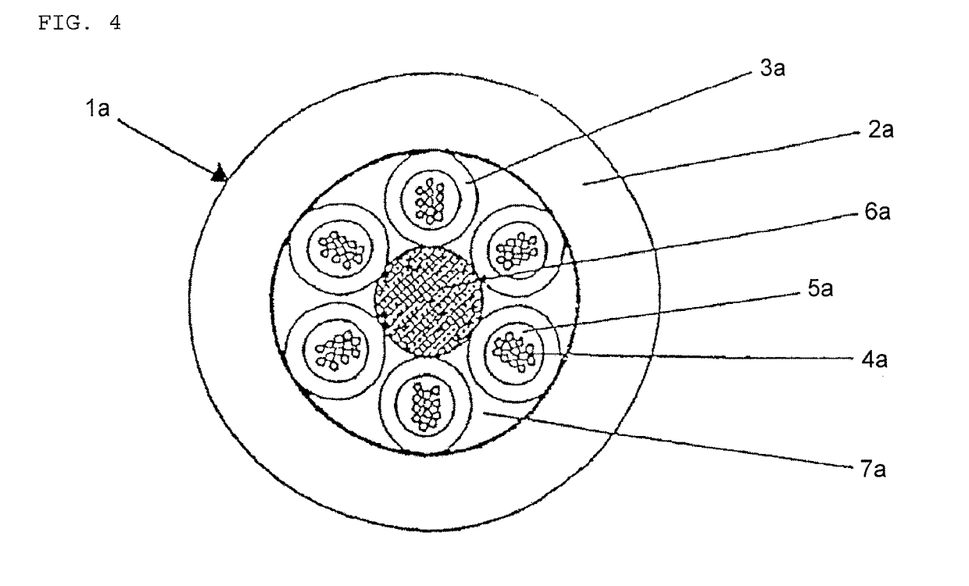
FIG. 4, shows, in cross section, an optical cable according to a further embodiment of the present invention.

FIG. 4 is a sectional view of an optical cable 1a consisting of an external layer 2a which may be made according to the present invention, a certain number of tubes 3a of polymeric material within which are housed the optical fibres 4a, normally embedded in a packing material 5a which has the purpose of preventing the longitudinal propagation of water in case of accidental rupture; the tubes containing the optical fibres are wound around a central support 6a normally made of glass-fiber reinforced plastic and capable of limiting the thermal contractions of the cable (the stranding may be of the continuous or alternate type, commonly called S-Z). Optionally, there may be inserted between the external layer 2a and the tubes 3a an interstitial packing material 7a capable of penetrating into the interstices between the tubes and the coating, between one tube and the next, and between the tubes and the support, in order to limit the longitudinal propagation of water inside the cable.

Figure 5:
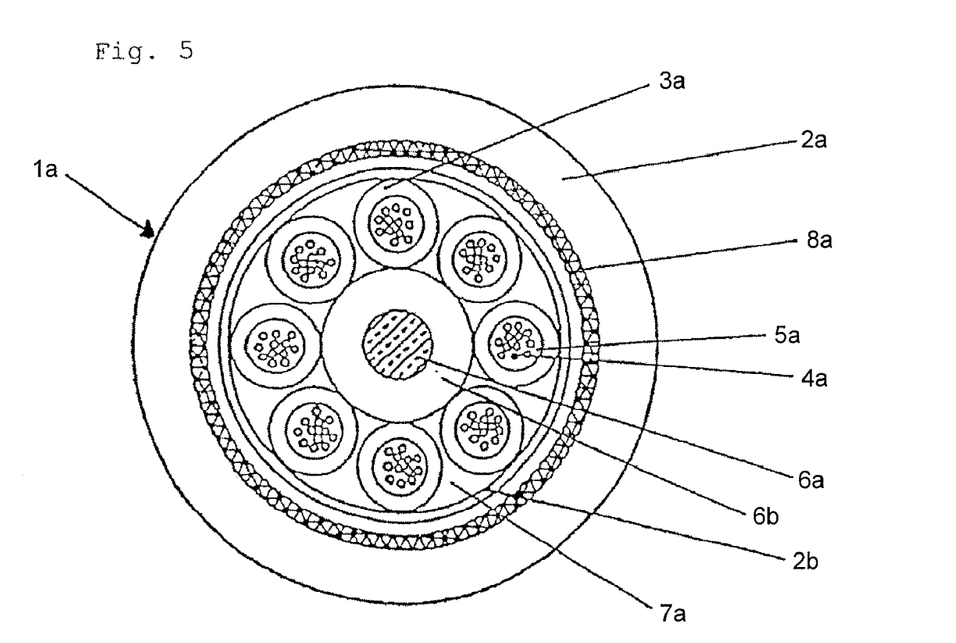
FIG. 5, shows, in cross section, an optical cable according to a further embodiment of the present invention.

FIG. 5 is a sectional view of an optical cable similar to that described in FIG. 4, with the difference that inside the external layer 2a there is a tensile reinforcing layer 8a (for example a glass fiber or polyaramid fiber such as the product known commercially as Kevlar®); additionally, the tubes 3a containing the optical fibres are surrounded by a sheath of a polymeric material 2b having one or more layers, which may be made according to the present invention Additionally, according to the embodiment shown in FIG. 5, the central support comprises a core 6a, made for example of glass-fiber reinforced plastic or similar materials, capable of limiting the thermal contractions of the cable, and a coating 6b, made for example of polymeric material, such that it increases the diameter of the core to a value capable of receiving the desired number of tubes wound around it.

Figure 6:
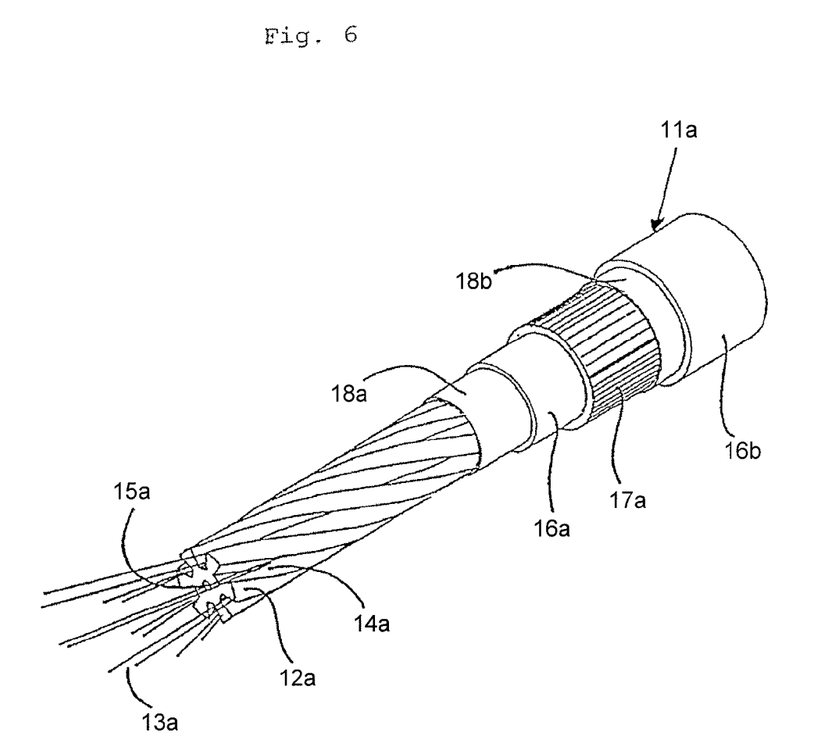
FIG. 6 shows, in perspective view, a length of an optical cable with parts removed in stages, to reveal its structure according to a further embodiment of the present invention.

FIG. 6 is a perspective view of an optical cable 11a according to the present invention in which the optical fibres 13a are located in housings in a central grooved core 12a made of polymeric material, which if necessary may be in contact with a suitable packing 14a; the grooved core may optionally contain a central support made of glass-fiber reinforced plastic 15a. The grooved core is therefore surrounded by a set of layers (16a, 16b) at least one of which may be made according to the present invention, and by a tensile reinforcing layer 17a which as been described above; optionally, the cable structure may also comprise a tape for the purposes of containment and/or protection of the fibers 18a and a wet-expanding tape 18b (for example a polyester or polyamide tape filled with wet-expanding material, such as sodium polyacrylate) for the purpose of limiting the longitudinal propagation of water inside the cable.

FIGS. 1, 2, 3, 4, 5 and 6 show just some possible embodiments of a cable according to the present invention.

Figure 7A:
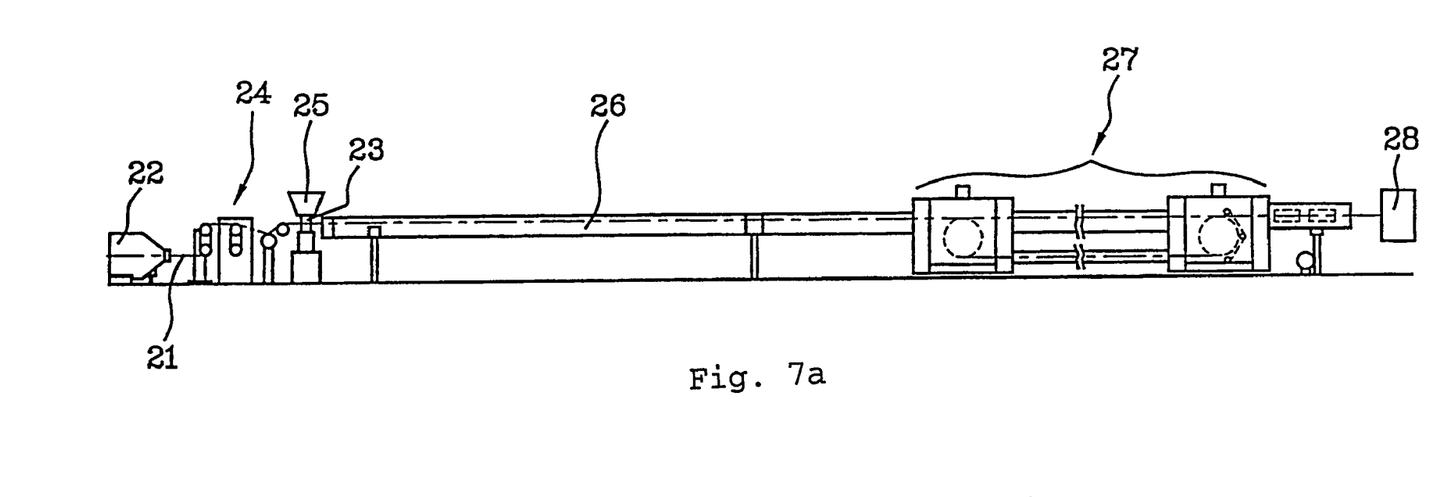
FIG. 7a and FIG. 7b show respectively a side view and a partial plan view of a process line according to one embodiment of the present invention.
Figure 7B:
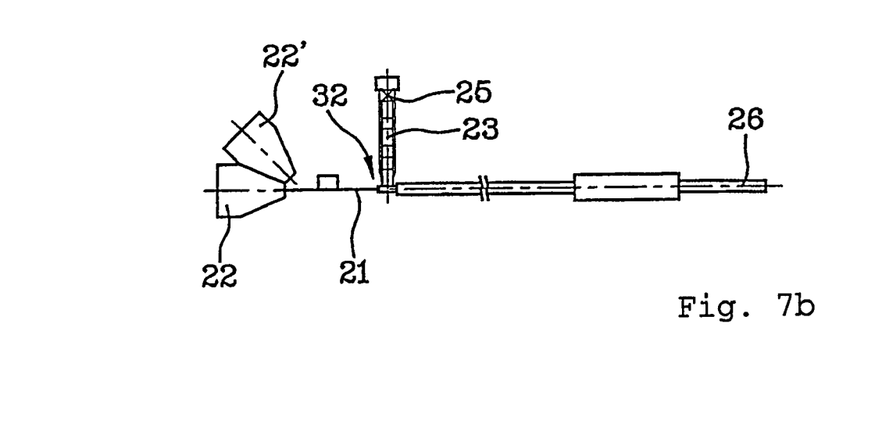

Referring to FIG. 7a and FIG. 7b, the main steps of a processing line for producing cables in accordance with the present invention are shown in schematic form, said process comprising the following steps:

a step of unwinding a core comprising at least one transmissive element from a feeding reel and conveying said core inside of the extrusion head of a given extruder;

a step of feeding a first polyethylene and a second polyethylene forming the coating layer of said cable into said extruder;

a step of melting and mixing said first and second polyethylenes within the extruder, followed by the steps of filtrating the obtained mixture and conveying the filtrated mixture into the extrusion head where the coating layer thus obtained is deposited around the aforesaid core;

a step of cooling the cable thus produced, and a phase of collecting the finished cable on a reel.

In the case where the coating material used is of a crosslinkable type, a crosslinking operation is provided upstream from the cooling stage.

More specifically, FIG. 7a represents a schematic side view of processing line 20 referred to above, and FIG. 7b represents a partial plan view of said line 20, in which the first stages of said process are shown.

With reference to the aforesaid FIG. 7a and FIG. 7b, a core 21 comprising a conductor, for example a conductor made of copper, and an insulating coating layer, is unwound from a feeding reel 22 according to any known technique and conveyed towards the extrusion head of an extruder 23, for example an extruder of the screw type turned by a motor of conventional type (not represented).

In FIG. 7b, a second feeding reel 22', in non-operating position, which substitutes first reel 22 once the unwinding operation of core 21 from said first reel is completed, is shown.

Also shown in FIG. 7a is a system 24 consisting of a plurality of pulleys and gears whose purpose is to ensure a regular and continuous feeding of the core 21 to extruder 23, especially at the stage where reel 22 is exhausted, and also a constant pull on core 21, at a predefined speed, so as to ensure uniform extrusion of the coating layer onto the core 21.

In general the forward speed of the core is between 10 m/min to 1000 m/min.

Simultaneously with the unwinding of the core 21 from feeding reel 22, the first polyethylene, the second polyethylene and the conventional additives optionally present in the coating material referred to above, are fed into the inlet of extruder 23 in a known manner, for example by means of a hopper 25. The first polyethylene, the second polyethylene and the conventional additives optionally present in the coating material, as reported above, may be premixed before being fed to the extruder, in a device upstream from the processing line represented in FIG. 7a or FIG. 7b. The premixing of the first polyethylene with the second polyethylene and with the conventional additives optionally present in the coating material, may be carried out, for example, in a Banbury mixer, in a twin-screw extruder, or during the process for obtaining the first polyethylene in a subdivided form above disclosed.

Preferably, for the aim of the present invention, the first polyethylene, the second polyethylene and the conventional additives optionally present in the coating material, are premixed in the extruding apparatus used in step (e) of the process for obtaining the first polyethylene in a subdivided form above disclosed.

Said first polyethylene, said second polyethylene, and the conventional additives optionally present in the coating material, as such or premixed, are charged inside of hopper 25 by means of suction nozzles which draw the material directly from packing containers.

Within extruder 23, said polyethylenes with the conventional additives optionally present, are homogeneously mixed and brought to plastification, i.e. to the molten state, by the work performed by the screw which pushes the coating material of the coating layer, imparting to it, moreover, the pressure necessary to overcome the pressure losses due to the presence of the various components which form the extrusion line.

The obtained coating material is then subjected to a filtration step, which will be better described below, and in the final portion of extruder 23 it is deposited on the core 21 so as to obtain the desired coating layer.

In the shown embodiment, this cable is then subsequently subjected to a suitable cooling cycle effected by moving the cable inside of a cooling channel 26 containing a suitable fluid, generally water at environmental temperature.

Furthermore, in FIG. 7a is shown a system 27 for multiple passage of the cable in cooling channel 26, this system consisting, for example, of a storage unit for the processing line capable of guaranteeing an accumulation of cable on a scale sufficient to ensure a forward speed of the cable that is constant and equal to the preset value.

This system 27 can also fulfil the function of making the cable thus obtained to follow a longer path within cooling channel in order to guarantee a more efficient cooling cycle of the cable itself.

Finally, downstream from this cooling stage, the cable is dried by means of air blowers (not represented) and then wound onto a collector reel 28 and sent to a storage area.

The filtration operation of the coating material, plasticized and rendered homogeneous by said screw, is performed by means of the positioning of a filter pack downstream from said screw, at the inlet to a connecting duct which links the extrusion head with the housing within which the extrusion screw is moved.

The filter pack may comprises one or more filter screens placed in series, generally three or even more filter screens, which are supported on a filter support plate 32.

It should be emphasized that the choice of the number and the type of the filter screens to be used in the filtration section of a production process is markedly influenced by the chemical and physical properties of the coating material to be subjected to filtration.

The process for producing a cable disclosed in FIG. 7a and in FIG. 7b, is described with reference to the case in which it is required to make a single core (unipolar) energy cable illustrated in FIG. 1 above disclosed. If different energy cable, or optical cable, or mixed electro-optical cable, are to be produced, the process above described, may be suitably modify as well known in the art.

The present invention is further described in the following examples, which are merely for illustration and must not be regarded in any way as limiting the invention.

Examples 1-5

Preparation of the Coating Materials

Table 1 shows the characterization of the components used in the examples.

The components were the following:

recycled PE: mixture of 90% by weight of low density polyethylene and 10% by weight of linear low density polyethylene, comprising 2.5% by weight of carbon black, coming from used agricultural films;

DGDK-3364® Natural: high density polyethylene from Dow Chemical;

recycled HDPE: high density polyethylene comprising 10% by weight of isotactic polypropylene coming from used bottles (Breplast);

DFDG 6059® Black: linear low density cable jacketing compound from Dow Chemical.

The Melt Flow Index (MFI) was measured at 190° C. with a load of 2.16 Kg according to ASTM D1238-00 standard.

The density was measured, at 23° C., according to CEI EN 60811-1-3 standard.

The melting point and the melting enthalpy ($\Delta H_m$) were measured by Mettler DSC instrumentation (second melting value) with a scanning rate of 10° C./min (instrument head type DCS 30; microprocessor type PC 11, Mettler software Graphware TA72AT.1).

The carbon black content was determined by Mettler TGA instrumentation using the following method:

heating from 20° C. to 85° C. at a scanning rate of 20° C./min in $N_2$ (60 ml/min);
leaving at 850° C. for 1 min in $N_2$ (60 ml/min);
leaving at 850° C. for 10 min in air (60 ml/min).

The obtained data are given in Table 1.

TABLE 1

| COMPONENT | MFI | Density (g/cm³) | Melting point (° C.) | Melting enthalpy (J/gr) | Carbon black (%) |
|---|---|---|---|---|---|
| Recycled PE | 0.45 | 0.920 | 121 | 110 | 2.5 |
| DGDK-3364 ® Natural | 0.70 | 0.945 | 127 | 180 | — |
| Recycled HDPE | 0.21 | 0.960 | 131 | 156 | — |
| DFDG 6059 ® Black | 0.60 | 0.932 | — | — | 2.6 |

The coating materials given in Table 2 (the amounts of the various components are expressed in % by weight with respect to the total weight of the coating material) were prepared as follows.

Agricultural films were fed to a conveyor belt and the impurities present (metal, paper, etc) were manually sorted out. Subsequently, the films were fed, by means of the same conveyor belt, to a mill obtaining flakes having an average diameter generally of between about 0.1 cm and about 2.0 cm.

The obtained flakes were washed in water and subsequently filtered in order to discard the impurities having a density higher than 1 kg/l. The flakes were subsequently dried in a drying apparatus with warm and dry air.

The dried flakes so obtained, Vibatan® PE black 99415, Anox® HB, DGDK® 3364, recycled HDPE, in the amount given in Table 2, were fed to a first single-screw extruder in 32 D configuration, with rotary speed of about 60 rev/min, with temperature in the various zones of the extruder of 215-225-225-220-225-225° C., the temperature of the extrusion head was 220° C. The obtained mixture was filtered (filter mesh: 180 μm) and subsequently fed to a second single-screw extruder in 32 D configuration, with rotary speed of about 100 rev/min, with temperature in the various zones of the extruder of 128-167-167-177-190-206° C., the temperature of the extrusion head was 200° C. The obtained mixture was filtered (filter mesh: 110 μm) and subsequently granulated with a cutting device having a rotatory blades obtaining granules having an average diameter of about 4 mm.

The obtained granules were then cooled in water and dried in a drying apparatus with warm and dry air.

TABLE 2

| | EXAMPLE | | | | |
|---|---|---|---|---|---|
| | 1 (*) | 2 | 3 | 4 | 5 (*) |
| Recycled PE | 100 | 56 | 56 | 51 | — |
| Vibatan ® PE Black 99415 | — | 3 | 3 | 3 | — |
| Anox ® HB | — | 1 | 1 | 1 | — |
| DGDK-3364 ® Natural | — | — | 40 | — | — |
| Recycled HDPE | — | 40 | — | 45 | — |
| DFDG-6059 ® Black | — | — | — | — | 100 |

(*): comparative.
Vibatan ® PE Black 99415: 40% dispersion of carbon black in low density polyethylene (VIBA Group);
Anox ® HB: 2,2,4-trimethyl-1,2-dihydroquinoline polymer (Great Lakes Chemical).

The obtained granules were subjected to the following analysis.

Hot Pressure Resistance

The hot pressure resistance test at 115° C. was determined according to IEC 60811-3-1 standard.

For this purpose, plates with thickness of 1 mm were prepared by compression moulding at 190° C. and 20 bar after preheating for 10 min at the same temperature.

The obtained plates were subjected to a temperature of 115° C., under a weight of 475 g, for 6 hours. After, their residual thickness was measured. The resistance to hot pressure test is the residual thickness expressed as a percentage of the initial thickness. The obtained data are given in Table 3.

Hardness

The Shore D hardness was determined according to ASTM D2240-03 standard.

For this purpose, plates with thickness of 8 mm were prepared according to the process above disclosed. The obtained data are given in Table 3.

Environmental Stress Crack Resistance (ESCR)

The ESCR was determined according to D-1693 standard, Cond. A.

For this purpose, plates with thickness of 3 mm and cut thickness of 0.65 mm in the case of the coating material of Example 1 (comparative), and with thickness of 2 mm and cut thickness of 0.4 mm in the case of the coating materials of Examples 2-4 according to the present invention and of Example 5 (comparative), were prepared according to the process above disclosed. The measurement was carried out at a temperature of 50° C. in the presence of 10% Igepal solution. The obtained data are given in Table 3.

TABLE 3

| | EXAMPLE | | | | |
|---|---|---|---|---|---|
| | 1 (*) | 2 | 3 | 4 | 5 (*) |
| Hot pressure resistance (%) | 30 | 97.5 | 96 | 97 | 90 |
| ESCR (hours) | <24 | 96 | 96 | 72 | >500 |
| Shore D | 50 | 55 | 55 | 57 | 56 |

(*): comparative.

The data above reported show that the coating materials according to the present invention (Examples 2-4) have hot pressure resistance and Shore D hardness values higher with respect to those obtained from recycled polyethylene alone (Example 1) and comparable or even higher with respect to those obtained from a commercial product (Example 5). With regard to the stress cracking resistance, the coating material according to the present invention shows improved values with respect to those obtained from recycled polyethylene alone.

Examples 6-10

Small cables were then prepared by extruding the coating materials according to Examples 1-5 onto a single red copper wire with a cross-section of 1.5 mm², so as to obtain a 3.4 mm thick cable. The extrusion was carried out by means of a 45 mm Bandera single-screw extruder in 25 D configuration, with rotary speed of about 45 rev/min. The speed line was about 10 m/min, with temperature in the various zones of the extruder of 115-160-190-190-180° C., the temperature of the extrusion head was 180° C.

Samples were taken with hand punches from the extruded layer to measure its mechanical properties in accordance with CEI 20-34, section 5.1, with an Instron instrument at a draw speed of 25 mm/min. The obtained data are given in Table 4.

TABLE 4

|  | EXAMPLE | | | | |
| --- | --- | --- | --- | --- | --- |
|  | 6 (*) | 7 | 8 | 9 | 10 (*) |
| Stress at break (MPa) | 15.8 | 19.4 | 18.9 | 19.8 | 20.9 |
| Elongation at break (%) | 515 | 622 | 629 | 650 | 710 |

(*): comparative.

The data above reported show that the coating materials according to the present invention (Examples 7-9) have mechanical properties higher with respect to those obtained from recycled polyethylene alone (Example 6) and comparable to those obtained from a commercial product (Example 10).

Figure 8:
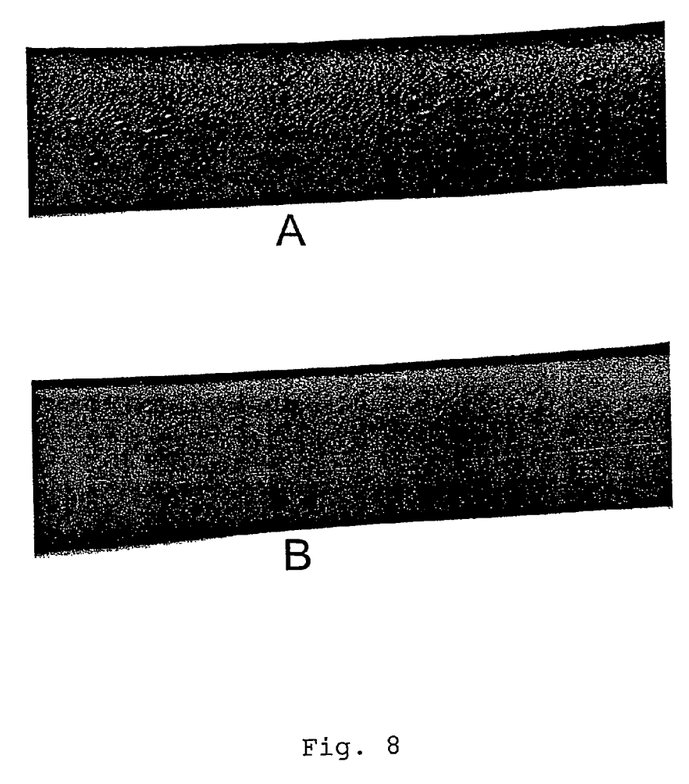
FIG. 8 shows a full scale photograph of an extruded coating layer obtained from recycled polyethylene alone (sample (A)) and an extruded coating layer obtained from the coating material according to the present invention (sample (B)).

Furthermore, two samples obtained as reported above were also examined in order to determine the presence of defects on the surface of the extruded coating layers: the enclosed photo (FIG. 8—full scale) shows that the extruded coating layer obtained from recycled polyethylene alone [Example 6—sample (A)] showed the presence of defects on its surface (e.g. small agglomerates are present); on the contrary, the extruded coating layers obtained from the coating material according to the present invention [Examples 9—sample (B)] did not show any detectable defects on its surface.

The invention claimed is:

1. A cable comprising at least one core comprising at least one transmissive element and at least one coating layer made from a coating material, comprising:
   at least a first polyethylene having a density not higher than 0.940 g/cm³ and a Melt Flow Index (MFI), measured at 190° C. with a load of 2.16 Kg according to ASTM 01238-00 standard, of 0.1 g/10 min to 1 g/10 min, said first polyethylene being obtained from a waste material; and
   at least a second polyethylene having a density higher than 0.940 g/cm³.

2. The cable according to claim 1, wherein said first polyethylene has a density not lower than 0.910 g/cm³.

3. The cable according to claim 1, wherein said first polyethylene has a density of 0.915 g/cm³ to 0.938 g/cm³.

4. The cable according to claim 1, wherein said second polyethylene has a density not higher than 0.970 g/cm³.

5. The cable according to claim 1, wherein said second polyethylene has a density of between 0.942 g/cm³ to 0.965 g/cm³.

6. The cable according claim 1, wherein said coating layer is a cable external layer having a protective function.

7. The cable according to claim 1, wherein said first polyethylene has a melting point lower than 130° C.

8. The cable according to claim 7, wherein said first polyethylene has a melting point of 100° C. to 125° C.

9. The cable according to claim 1, wherein said first polyethylene has a melting enthalpy of 50 J/g to 150 J/g.

10. The cable according to claim 9, wherein said first polyethylene has a melting enthalpy of 80 J/g to 140 J/g.

11. The cable according to claim 1, wherein said first polyethylene comprises a carbon black in an amount higher than 2% by weight with respect to the total weight of the first polyethylene.

12. The cable according to claim 11, wherein said first polyethylene comprises a carbon black in an amount of 2.5% by weight to 4.0% by weight with respect to the total weight of the first polyethylene.

13. The cable according to claim 1, wherein said first polyethylene is selected from low density polyethylene (LOPE), linear low density polyethylene (LLDPE), very low density polyethylene (VLDPE), or mixtures thereof.

14. The cable according to claim 13, wherein said first polyethylene is selected from mixtures of low density polyethylene with an amount not higher than 15% by weight with respect to the total weight of the polyethylene, of linear low density polyethylene.

15. The cable according to claim 1, wherein said first polyethylene is present in the coating material in an amount of 30% by weight to 90% by weight with respect to the total weight of the coating material.

16. The cable according to claim 15, wherein said first polyethylene is present in the coating material in an amount of 40% by weight to 60% by weight with respect to the total weight of the coating material.

17. The cable according to claim 1, wherein said second polyethylene has a Melt Flow Index (MFI), measured at 190° C. with a load of 2.16 Kg according to ASTM 01238-00 standard, of 0.05 g/10 min to 2 g/10 min.

18. The cable according to claim 1, wherein said second polyethylene has a Melt Flow Index (MFI), measured at 190° C. with a load of 2.16 Kg according to ASTM 01238-00 standard, of 0.1 g/10 min to 1 g/10 min.

19. The cable according to claim 1, wherein said second polyethylene has a melting point higher than 120° C.

20. The cable according to claim 19, wherein said second polyethylene has a melting point of 125° C. to 165° C.

21. The cable according to claim 1, wherein said second polyethylene has a melting enthalpy of 125 J/g to 200 J/g.

22. The cable according to claim 21, wherein said second polyethylene has a melting enthalpy of 130 J/g to 185 J/g.

23. The cable according to claim 1, wherein said second polyethylene is a polyethylene obtained from waste material.

24. The cable according to claim 23, wherein said second polyethylene comprises an amount not higher than 15% by weight with respect to the total weight of the polyethylene, of polypropylene.

25. The cable according to claim 1, wherein said second polyethylene is present in the coating material in an amount of 10% by weight to 70% by weight with respect to the total weight of the coating material.

26. The cable according to claim 25, wherein said second polyethylene is present in the coating material in an amount of 40% by weight to 60% by weight with respect to the total weight of the coating material.

27. The cable according to claim 1, wherein said coating material comprises carbon black.

28. The cable according to claim 27, wherein said carbon black is added to the coating material in an amount of 2% by weight to 5% by weight with respect to the total weight of the coating material.

29. The cable according to claim 28, wherein said carbon black is added to the coating material in an amount of 2.5% by weight to 4.0% by weight with respect to the total weight of the coating material.

30. The cable according to claim 1, wherein said coating material is crosslinked.

31. The cable, according to claim 1, wherein said coating material is not crosslinked.

32. A process for producing a cable comprising at least one core comprising at least one transmissive element and at least one coating layer made from a coating material, comprising the steps of:
  providing at least a first polyethylene having a density not higher than 0.940 g/cm³ and a Melt Flow Index (MFI), measured at 190° C. with a load of 2.16 Kg according to ASTM 01238-00 standard, of 0.05 g/10 min to 2 g/10 min, in a subdivided form, said first polyethylene being obtained from a waste material;
  providing at least a second polyethylene having a density higher than 0.940 g/cm³, in a subdivided form;
  conveying at least one core comprising at least one transmissive element into an extruding apparatus comprising a housing and at least one screw rotatably mounted into said housing, said housing including at least a feed hopper and at least a discharge opening;
  feeding said first and second polyethylenes to said extruding apparatus;
  melting and mixing said first and second polyethylenes in said extruding apparatus to form a homogeneous mixture;
  filtering said mixture; and
  depositing said mixture onto said core comprising at least one transmissive element so as to obtain the coating layer.

33. The process for producing a cable according to claim 32, wherein said first polyethylene has a density not lower than 0.910 g/cm³.

34. The process for producing a cable according to claim 32, wherein said first polyethylene has a density of 0.915 g/cm³ to 0.938 g/cm³.

35. The process for producing a cable according to claim 32, wherein said first polyethylene has a Melt Flow Index (MFI), measured at 190° C. with a load of 2.16 Kg according to ASTM 01238-00 standard, of 0.1 g/10 min to 1 g/10 min.

36. The process for producing a cable according to claim 32, wherein said second polyethylene has a density not higher than 0.970 g/cm³.

37. The process for producing a cable according to claim 32, wherein said second polyethylene has a density of 0.942 g/cm³ to 0.965 g/cm³.

38. The process for producing a cable according to claim 32, wherein said extruding apparatus is a single-screw extruder.

39. The process for producing a cable according to claim 32, wherein said melting and mixing is carried out at a temperature of 150° C. to 250° C.

40. The process for producing a cable according to claim 39, wherein said melting and mixing is carried out at a temperature of 120° C. to 230° C.

41. The process for producing a cable according to claim 32, wherein said first polyethylene and said second polyethylene are premixed before the step of feeding them to the extruding apparatus.

42. The process for producing a cable according to claim 32, wherein said first polyethylene has a melting point lower than 130° C.

43. The process for producing a cable according to claim 32, wherein said second polyethylene has a Melt Flow Index, measured at 190° C. with a load of 2.16 Kg according to ASTM 01238-000 standard, 0.05 g/10 min to 2 g/10 min.

44. The process for producing a cable according to claim 32, wherein said first polyethylene is obtained from a waste material in a subdivided form by means of a process comprising the following steps:
  (a) sorting out the impurities optionally present in a waste material;
  (b) feeding the waste material obtained in step (a) to a mill obtaining flakes having an average diameter of about 0.1 cm to about 2.0 cm;
  (c) washing the flakes obtained in step (b) in water and filtering the same in order to discard the impurities having a density higher than 1 kg/l;
  (d) drying the flakes obtained in step (c) with warm and dry air;
  (e) feeding the dried flakes obtained in step (d) to an extruding apparatus comprising a housing and at least one screw rotatably mounted in said housing, including at least a feed hopper and a discharge opening;
  (f) melting and mixing said flakes obtaining a homogeneous mixture;
  (g) filtering and granulating the homogeneous mixture obtained in step (f) obtaining a product in a subdivided form;
  (h) cooling the product in a subdivided form obtained in step (g); and
  (i) drying the cooled product obtained in step (h) with warm and dry air.

45. The process for producing a cable according to claim 44, wherein the homogeneous mixture obtained in step (f) is fed to a second extruding apparatus.

46. The process for producing a cable according to claim 44, wherein said extruding apparatus is a single-screw extruder.

* * * * *